United States Patent Office 3,706,602
Patented Dec. 19, 1972

3,706,602
FUEL CELL ELECTRODE STRUCTURE UTILIZING CAPILLARY ACTION
George T. Miller, Lewiston, N.Y., assignor to Hooker Chemical Corporation, Niagara Falls, N.Y.
Continuation-in-part of application Ser. No. 673,202, Oct. 5, 1967. This application Dec. 18, 1969, Ser. No. 886,166
Int. Cl. H01m 21/04
U.S. Cl. 136—120 FC    11 Claims

ABSTRACT OF THE DISCLOSURE

A fuel electrode is provided by wrapping or pressing a hydrophobic, porous sheet of fiber or paper, upon which a catalyst is deposited, into contact with an electrically conductive base or support. In use, a liquid fuel, substantially insoluble in the electrolyte moves by capillary action or wicks between the electrode base and the hydrophobic, porous sheet of material to contact the catalyst at the electrolyte, catalyst, fuel interface, generating electrical current.

RELATED APPLICATION

This application is a continuation-in-part of Ser. No. 673,202, filed Oct. 5, 1967, now Pat. No. 3,544,381.

BACKGROUND OF THE INVENTION

Fuel cells are systems or apparatuses designed to produce electrical energy by consumption of chemical energy resulting from the oxidation of materials such as hydrogen, carbon monoxide, alcohols, hydrocarbons or the like. Preferably such cells are adapted for continuous operation by feeding a fuel and an oxidant continuously into the cell to the fuel electrode and oxidizer electrode, respectively. Preferred oxidants are oxygen, or an oxygen containing gas such as air. When the fuel or oxidizible material is a gas such as hydrogen or a low molecular weight hydrocarbon, it is fed into the cell by way of a porous electrode, through which the gaseous material passes into contact with the electrolyte. The fuel electrode is commonly provided with a catalytic material such as platinum on the surface of the electrode exposed to the electrolyte whereby the fuel gas fed into the porous electrode contacts both the catalyst and the electrolyte.

Heretofore, fuels utilized in fuel cells have been chiefly hydrogen, gaseous hydrocarbons or other carbonaceous gases, or water soluble materials such as methanol and ethanol. The use of gaseous fuels requires the employment of porous electrodes which have a number of disadvantages. In addition, for many uses of fuel cells, small portable cells are most desirable which are readily transportable to remote areas where electric energy is not available. For such purposes, a fuel which is readily stored and handled and is readily available at such locations is highly desirable. Liquid hydrocarbon fuels are ideal under these circumstances. Thus, any expedition proceeding to localities where electric energy is not available would generally carry liquid hydrocarbon fuel for their means of transportation. This same fuel may be used for operating the fuel cells of this invention.

In operating a fuel cell with a porous fuel electrode, care must be taken to prevent flooding of the sites of catalytic activity by the electrolyte which would prevent contact between the fuel and catalyst. Likewise, when a liquid fuel is used there is a tendency to flood the catalyst sites with the liquid fuel. In addition, liquid hydrocarbon fuels tend to plug the pores of a porous electrode with polymerization products.

SUMMARY OF THE INVENTION

An object of this invention is to provide an electrode for a fuel cell which is operable with a liquid fuel. A further object is to provide an improved means for bringing a liquid fuel into contact with the electrolyte and the catalyst on a fuel cell electrode. Another object is to bring the liquid fuel into contact with the electrolyte and catalyst over an extended area of the electrode. Other objects are apparent from the following detailed description of the invention.

In accordance with this invention there is provided an electrode comprising an electrically conductive base to which is non-adhesively secured a porous, hydrophobic sheet upon which a catalyst is disposed, said sheet and said base forming a contiguous interface and being so constructed and united that a liquid fuel moves by capillary action or wicks within said interface and passes through said sheet into contact with said catalyst. As a fuel electrode in a fuel cell, the electrode of this invention, when exposed to an oxidizable liquid material as fuel and an electrolyte within a fuel cell causes the liquid fuel to pass in a thin layer or film between the contiguous interface of the electrically conductive base and the porous, hydrophobic sheet. The oxidizable liquid fuel passes through the porous, hydrophobic sheet to simultaneously contact the catalyst and the electrolyte. The porous, hydrophobic sheet is non-adhesively secured to the electrically conductive base in any suitable manner such as by tying with an inert fiber, cord or wire or by pressure of an inert screen or the like.

The liquid fuel may be disposed above or below the fuel electrode, depending upon the specific gravity of the fuel. Where the fuel is heavier than the electrolyte, it will move by capillary action or wick up the electrode from its bottom reservoir. Where the fuel is lighter than the electrolyte, it will form a floating reservoir in the fuel electrode compartment, from which it will move by capillary action or wick down the electrode or preferably be pumped to the base of the electrode from where it will move by capillary action or wick upward. The liquid fuel fills the void between the porous, hydrophobic sheet and the electrically conductive electrode base. The fuel passes through the porous, hydrophobic sheet to contact the catalyst and electrolyte simultaneously.

The catalyst deposited upon the porous, hydrophobic sheet is any catalyst conventionally employed in fuel cell technology. For example, broadly the noble metals and more specifically the platinum and palladium group metals are applicable in their oxide, metallic and salt form. Likewise, carbon or graphite may be employed as the catalyst. The catalyst may be impregnated throughout the porous, hydrophobic sheet of material to provide good electrical conductivity through the hydrophobic sheet. However, it is the catalytic material on the surface of the porous, hydrophobic sheet which is in contact with both the electrolyte and the organic fuel which is the functional catalyst in the operation of a fuel cell.

DESCRIPTION OF PREFERRED EMBODIMENTS

Figure 1:
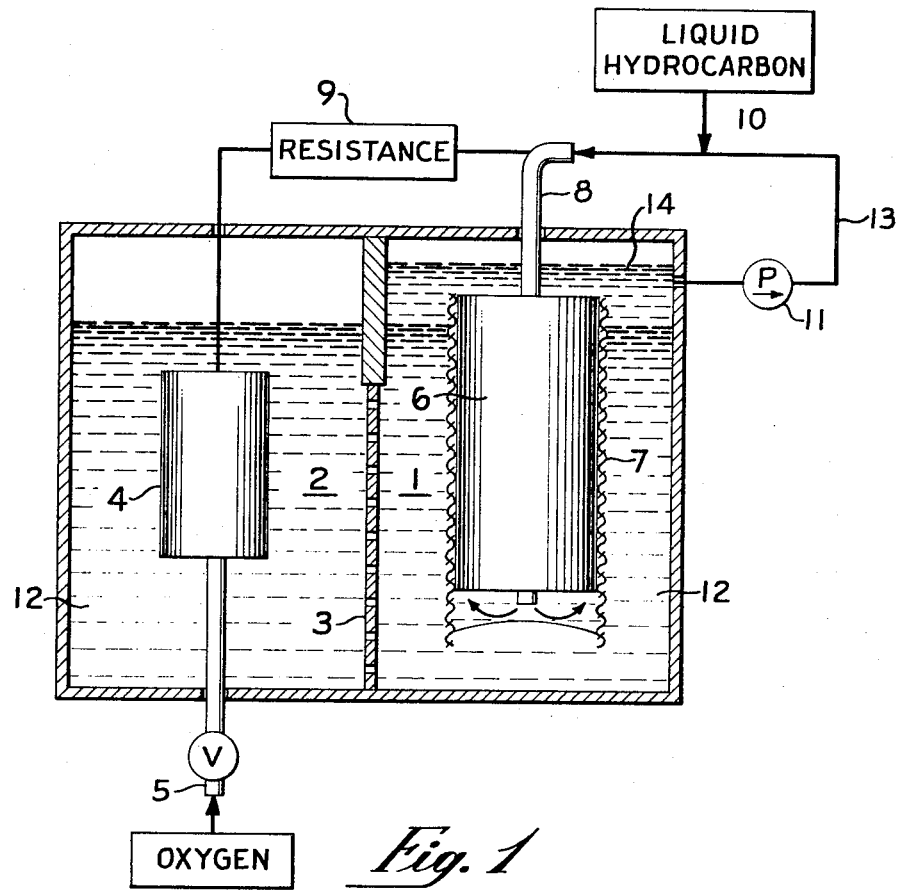
FIG. 1 is a diagrammatic illustration of a fuel cell which contains the electrode of the present invention.
Figure 2:
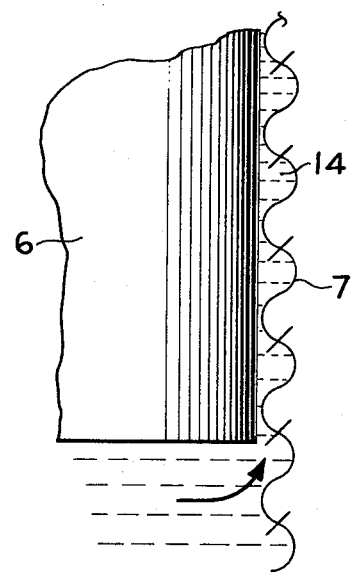
FIG. 2 is a magnified presentation of the fuel electrode of the invention.

The fuel cell illustrated by FIG. 1 is provided with fuel electrode compartment 1 and oxidizer electrode compartment 2 which are separated by porous diaphragm 3. Compartment 2 is provided with a conventional oxidizer electrode 4 fed with oxygen or air through inlet pipe 5. Compartment 1 is provided with fuel electrode 6 which may be made of any electroconductive material having tightly wrapped around it or pressed against it, a porous, hydrophobic sheet 7 upon which a catalyst such as platinum or platinum black is deposited. Fuel electrode 6 is provided with a pipe 8, passing through the length of the electrode. Pipe 8 also functions as the lead for connecting the electrode to resistance 9 to which electrode 4 is electrically connected. Resistance 9, of course, represents any means for utilizing the electrical power generated by the cell whether by transference into heat, mechanical motion or other forms of energy. Pipes 10 and 13 and associated pump 11 serve to flow liquid fuel into pipe 8 from the liquid fuel reservoir and from unreacted fuel (14) floating on electrolyte 12.

Electrode 6 and its covering 7 serve to move by capillary action or wick the fuel 14 upward so as to fill the interstices between their surfaces. The fuel penetrates the porous, hydrophobic sheet contacting simultaneously the catalyst on the surface of 7 and the electrolyte 12. The electrolyte 12 is any conventional liquid electrolyte, for example sulfuric or phosphoric acid. The liquid fuel pumped through pipe 8 forms a pool at the base of the electrode. The fuel forms a meniscus at the base of the electrode through its preferential wetting action of the porous, hydrophobic sheet.

While an important object of this invention is to provide a means for utilizing liquid hydrocarbons as fuels in fuel cells, the invention is not restricted thereto and it is applicable to employment of any liquid fuel in a fuel cell. Practically any organic liquid may be utilized, except that liquids such as lower molecular weight alcohols which are readily soluble in the electrolyte are not within the scope of this invention, because they react from solution, whereas my invention comprises reacting a film of liquid fuel on the surface of the electrode in contact with the electrolyte as a separate phase. However, the mere presence of oxidizable material which is soluble in the electrolyte in the liquid fuel compartment is not deleterious to the practice of my invention and therefore is included. In addition to liquid hydrocarbons, whether aliphatic or aromatic, other applicable fuels are nitriles, esters, high molecular weight alcohols and ketones, azo compounds, liquid aromatic acids and other carboxylic compounds. Solutions of solid carbon-containing compounds, such as high molecular weight fatty acids, naphthalene and the like may be utilized by dissolving them in liquid hydrocarbons or other liquid fuel and feeding the solutions to the improved electrode. Likewise, gaseous hydrocarbons or other oxidizable gases dissolved in liquid hydrocarbon may be employed as the liquid fuel. The solvents thus used need not function as fuels, but they may be only partly or substantially completely resistant to oxidation in the fuel cell and function mainly to transport the oxidizable material to the sites of reaction. Solvents thus resistant to oxidation include silicone oils and various halogenated hydrocarbons such as carbon tetrachloride, chloroethylenes and the fluoroethylenes. One function of such solvent is to modify the specific gravity of the fuel stream; for example, the solution may be made heavier than the aqueous electrolyte. It is to be understood that the term "liquid fuel" includes all fuel materials which are liquid at the temperature of the electrolyte in contact with the fuel electrode.

The invention is not restricted to carbonaceous liquid fuels but any oxidizable liquid material for example, molten phosphorus or molten sulfur, may be used. Thus, in the employment of molten phosphorus, utilizing phosphoric acid as the electrolyte, the phosphorus is oxidized to form phosphoric acid while simultaneously producing an electric current, thereby decreasing the cost of production of the oxidation product. Similarly, sulfur may be converted to sulfurous and sulfuric acids and simultaneous production of the electric current.

The electro-conductive material which the porous, hydrophobic sheet contacts may be made of graphite, carbon or any metal which is compatible with the electrolyte employed such as steel, brass, copper, lead, tin and various alloys of these metals. If desired, organic plastic materials which have been rendered electro-conductive by coatings of metals or other conductors or by impregnation with conductive metal or carbon powders may be used. Either a porous or non-porous electro-conductive material may be used as the support for the porous, hydrophobic sheet. However, a non-porous or solid base is preferred over a porous base.

The function of the diaphragm in a fuel cell is to prevent the fuel from contacting the oxidizing electrode and to keep the oxidizing material from the fuel electrode. Any of the conventional devices serving this function may be employed, whether semi permeable diaphragms or merely partitions or submerged weirs.

The porous, hydrophobic sheet which is non-adhesively attached to the electrolytically conductive base may be any material which is not wet by the electrolyte employed in the fuel cell and is porous to the extent that the liquid fuel will pass through it into contact with the catalyst and electrolyte. The porous, hydrophobic sheet may be a cloth, paper or film produced by weaving, knitting, felting, matting, or casting techniques known to the art. The porous, hydrophobic sheet may be naturally hydrophobic as in the case of polymeric hydrocarbons and halocarbons or may be treated by methods known in the art to render it hydrophobic. In many instances, the porous sheet may be rendered hydrophobic for use as an electrode merely by wetting it with the liquid fuel prior to exposure to the electrolyte.

Among the various materials which may be used to formulate a porous, hydrophobic sheet for use in the instant invention, there may be mentioned broadly inorganic fibrous materials and organic polymeric materials.

Representative examples of the inorganic fibrous materials which may be employed as the porous, hydrophobic sheet of the instant invention are asbestos, graphite and glass in the form of woven, matted, felted, knitted and cast films or papers upon which the catalyst is deposited or within which the catalyst is impregnated. Examples of applicable asbestos materials are chrysotile, anthophollite. Woven graphite fibers are applicable. Glass wool is exemplary of ceramic material which is applicable. The alumina-silica paper (Fiberfrax) is a known material which may be used in the instant invention.

Examples of organic polymers which are applicable as the porous, hydrophobic sheet to be used in the electrodes of the instant invention include polyolefins such as polymers and copolymers of ethylene, propylene, butylene, amylene, isoprene, butadiene and their derivatives such as polymers and copolymers of acrylonitrile, methacrylonitrile, vinyl chloride, vinyl alcohol, tetrafluoroethylene, and the like as well as natural and synthetic rubber and polyesters such as polymers and copolymers of polyols and polybasic carboxylic acids. Representative of polybasic carboxylic acids are the phthalic acids, meta-, ortho- and tere-phthalic acids, fumaric acid, maleic acid, itaconic acid, trimellitic acid, trimesic acid and the like. Representative polyols are the lower alkylene glycols such as ethylene glycol, propylene glycol, butylene glycol, pentaerythritol, and the like. Likewise, polyesters derived from dallyl phthalate provide applicable materials. Phenolic resins such as the phenol-formaldehyde polymers and phenol-acetaldehyde polymers are applicable. Polyethers derived from epoxides such as the lower alkylene oxides of ethylene, propylene and butylene present operable porous, hyrophobic materials. The known furan polymers are applicable.

In essence, the porous, hydrophobic sheet of material may be derived from any hydrophobic material which is not preferentially wetted by the aqueous electrolyte within the fuel cell and which is porous toward the liquid fuel upon which the fuel electrode operates. Especially suitable porous hydrophobic sheet material for the production of the electrodes of this invention are disclosed in U.S. 3,348,974, 3,328,205, 3,223,556; and 3,117,034. Of these materials the preferred porous, hydrophobic sheet is the acrylic polymers disclosed in the first mentioned patent.

EXAMPLE 1

A fuel electrode was prepared by wrapping a sheet of platinum treated acrylic fiber paper (prepared in accordance with U.S. 3,328,205) around a graphite rod and tying it securely with a "Teflon" fiber. The electrical resistance due to poor contact of the paper and the graphite is appreciable. However, the capillarity wicking action was acceptable. The surface area of the paper electrode was 10–12 cm.$^2$.

The electrode so prepared was wetted by soaking it in octane and then it was placed in a fuel cell constructed from glass in the form of an H and separated into two electrode compartments by a fritted glass diaphragm in the horizontal section. The oxidizer electrode consisted of a cylinder of platinum screen and oxygen was introduced below the electrode. The electrolyte was 10% by volume $H_3PO_4$ and the fuel was octane. The fuel cell was operated at a temperature of about 100° C. and produced the following results.

Fuel cell condition

Open circuit potential difference=0.81 volt.

| Current-milliamperes: | Volt |
| --- | --- |
| 0.1 | 0.77 |
| 0.3 | 0.72 |
| 1.0 | 0.60 |
| 2.0 | 0.48 |
| 3.0 | 0.40 |
| 5.9 | 0.23 |
| 10.0 | 0.06 |

EXAMPLE 2

Example 1 was repeated under the same conditions with the sole distinction that the paper electrode was not originally soaked in octane, providing the following results:

Fuel cell condition

Open circuit potential difference=0.78 volt.

| Current-milliamperes: | Volt |
| --- | --- |
| 0.1 | 0.76 |
| 0.3 | 0.72 |
| 1.0 | 0.60 |
| 2.1 | 0.51 |
| 3.0 | 0.44 |
| 5.3 | 0.23 |
| 9.0 | 0.03 |

EXAMPLE 3

A paper electrode made in the manner set forth in Example 1 was platinized electrochemically from chloroplatinic acid solution in order to increase the electrical conductivity of the paper electrode.

The electrode so prepared was placed in the fuel cell described in Example 1.

Fuel cell condition

Open circuit potential difference=0.80 volt.

| Current-milliamperes: | Volt |
| --- | --- |
| 0.1 | 0.79 |
| 0.3 | 0.75 |
| 1.0 | 0.66 |
| 3.0 | 0.50 |
| 6.0 | 0.35 |

EXAMPLE 4

Example 3 was repeated identical conditions with the sole exception that 20% by volume $H_3PO_4$ was employed as the electrolyte, with the following results:

Fuel cell condition

Open circuit potential difference=0.76 volt.

| Current-milliamperes: | Volt |
| --- | --- |
| 0.1 | 0.75 |
| 0.3 | 0.71 |
| 1.0 | 0.64 |
| 3.0 | 0.54 |
| 6.0 | 0.40 |
| 10.0 | [1] 0.15 |

[1] Decreasing.

EXAMPLE 5

Example 3 was repeated. One square centimeter of electrode area was exposed to the electrolyte.

The voltage at 1 milliampere current is 0.60 which drops to 0.52 after 30 minutes. The current was then dropped to 0.29 milliampere for 5 minutes. By increasing the current to 1 milliampere again the voltage increased to 0.56.

To study the effect of surface active agents on the paper electrode of this invention, the following experiments were conducted.

EXAMPLE 6

A fuel electrode prepared as in Example 3 was placed in the fuel cell operating on octane, 10% by volume $H_3PO_4$ at about 100° C.

Fuel cell condition

Open circuit potential difference=0.73 volt.

| Current-milliamperes: | Volt |
| --- | --- |
| 0.1 | 0.70 |
| 0.3 | 0.62 |
| 1.0 | 0.50 |
| 3.0 | [1] 0.34 |
| 6.2 | 0.09 |

[1] Decreasing to 0.28.

On opening the circuit, the potential difference was 0.72 volt. Sodium xylene sulfonate (0.43 gm.) was added and the open circuit potential difference rose to 0.79 volt.

Fuel cell condition

| Current-milliamperes: | Volts |
| --- | --- |
| 0.1 | 0.74 |
| 0.3 | 0.66 |
| 1.0 | 0.53 |
| 2.6 | 0.34 |
| 3.0 | 0.30 |
| 4.9 | 0.09 |

To study the function of the electrolyte, the following experiments were conducted.

EXAMPLE 7

A paper electrode was prepared as described in Example 3. It had a platinized surface area of 10 square centimeters. Rather than employing $H_3PO_4$ solely as the electrolyte, a mixture of 10% by volume $H_3PO_4$ and 10% by volume HCl were employed in 1:1 proportion with octane fuel at a temperature of about 100° C.

Fuel cell condition

Rest potential of the paper electrode vs. a saturated calomel electrode=0.47 volt.

Rest potential of the $O_2$ electrode vs. a saturated calomel electrode=0.56 volt.

Open circuit potential difference after cathodic pulse on the paper electrode=0.16 volt.

| Current-milliamperes: | Volts |
| --- | --- |
| 0.1 | 0.15 |
| 0.3 | 0.13 |
| 1.0 | 0.08 |

EXAMPLE 8

A paper electrode was produced as disclosed in Example 3. It had a surface area of 10 square centimeters. On octane fuel at about 100° C. in 10% by volume $H_2SO_4$ fuel cell data was collected as follows:

Fuel cell condition

Open circuit potential difference=0.77 volt.

| Current-milliamperes: | Volts |
|---|---|
| 0.1 | 0.71 |
| 0.3 | 0.65 |
| 1.0 | 0.57 |
| 3.0 | 0.45 |
| 10.0 | [1] 0.30 |

[1] Decreasing to 0.21.

By adding equal volumes of 10% by volume $H_2SO_4$ to the system just described, the open circuit potential dropped from 0.77 volt to 0.62 volt.

EXAMPLE 9

Electrodes prepared with a hydrophobic mat or cloth of asbestos, glass or graphite in lieu of the platinum treated acrylic fiber paper of Example 1 are exposed respectively, as the fuel electrode in a fuel cell. The results obtained from operation of these individual electrodes are substantially the same as that obtained from the use of an acrylic paper.

EXAMPLE 10

Electrodes prepared with a hydrophobic cloth or film of polyvinyl chloride, polyethylene, polyperfluoroethylene, terephthalic acid and ethylene glycol (Dacron), or polyethylene oxide, respectively, in lieu of the acrylic fiber paper of Example 3 are employed as fuel electrodes in a fuel cell. The electrodes so constructed produce substantially the same results as are obtained with the acrylic fiber paper electrode upon exposure as a fuel electrode in a fuel cell.

What is claimed is:

1. A fuel electrode for a fuel cell comprising an electrically conductive base and a porous, hydrophobic sheet upon which a catalyst is disposed, said sheet being non-adhesively and discontinuously secured to said base so as to form, between said sheet and said base, as a contiguous interface, a passageway of a size sufficiently small as to permit the movement of liquid fuel therethrough by capillary action and passage of said fuel from said passageway through the sheet into contact with said catalyst.

2. The electrode of claim 1 in which said electrically conductive base is a graphite rod.

3. The electrode of claim 1 in which said electrically conductive base is a metal selected from the group consisting of steel, brass, copper, lead, tin and alloys thereof.

4. The electrode of claim 1 in which said electrically conductive base is lead.

5. The electrode of claim 1 in which said porous, hydrophobic sheet is comprised of a material selected from the group consisting of inorganic fibrous materials and organic polymeric materials.

6. The electrode of claim 1 in which said porous, hydrophobic sheet is a polymeric acrylic fiber paper.

7. The electrode of claim 1 in which said porous, hydrophobic sheet is asbestos.

8. The electrode of claim 1 in which said porous, hydrophobic sheet is polyvinyl chloride.

9. The electrode of claim 1 in which said porous, hydrophobic sheet is polyethylene.

10. The electrode of claim 1 in which said catalyst is selected from the group consisting of carbon, a noble metal and mixtures thereof.

11. The electrode of claim 1 in which said catalyst is platinum.

References Cited

UNITED STATES PATENTS

| 600,719 | 3/1898 | Habermann | 136—164 |
|---|---|---|---|
| 2,942,053 | 6/1960 | Baldwin, Jr. et al. | 136—6 |
| 3,183,123 | 5/1965 | Haworth | 136—86 D |
| 3,276,909 | 10/1966 | Moos | 136—86 D |
| 3,333,986 | 8/1967 | Chreitzberg et al. | 136—6 |
| 3,379,634 | 4/1968 | Rutkowski | 136—86 R UX |
| 3,281,275 | 10/1966 | Levine et al. | 136—86 |

ALLEN B. CURTIS, Primary Examiner

U.S. Cl. X.R.

136—86 R